United States Patent [19]

Baker et al.

[11] 4,360,264
[45] Nov. 23, 1982

[54] VARIABLE MAGNIFICATION SLIDE COPY CAMERA

[75] Inventors: Philip G. Baker, Peabody; Gerald L. Matthews, Raynham, both of Mass.

[73] Assignee: Polaroid Corporation, Cambridge, Mass.

[21] Appl. No.: 288,820

[22] Filed: Jul. 31, 1981

[51] Int. Cl.³ ............................................. G03B 27/52
[52] U.S. Cl. ...................................... 355/40; 355/43; 355/27; 355/55; 354/78
[58] Field of Search ...................... 355/43, 40, 27, 18, 355/55; 354/80, 78

[56] References Cited

U.S. PATENT DOCUMENTS

| | | |
|---|---|---|
| 2,866,380 | 12/1958 | Bing et al. |
| 3,065,667 | 11/1962 | Edgerton |
| 3,645,620 | 2/1972 | Jaffe |
| 3,653,760 | 4/1972 | Johnson |
| 3,697,175 | 10/1972 | Sullivan |
| 3,890,044 | 6/1975 | Feren ................................. 354/80 |
| 4,026,651 | 5/1977 | Vitou ................................. 355/55 |
| 4,082,446 | 4/1978 | Driscoll et al. ..................... 355/27 |
| 4,184,763 | 1/1980 | Handsman et al. ................. 355/27 |
| 4,200,392 | 4/1980 | Svatek |
| 4,230,407 | 10/1980 | Moller ............................... 354/80 |

*Primary Examiner*—Monroe H. Hayes
*Attorney, Agent, or Firm*—John S. Vale

[57] ABSTRACT

A copy camera, preferably configured to make enlarged prints from 35mm slides, operates in at least two different magnification modes for providing either a full frame or cropped reproduction of the slide on a film unit having an image area format that differs from that of the slide. Magnification change is accomplished by locating the slide and film unit at alternative corresponding object and film planes that are located at different predetermined image and object distances from a projection lens. An electromechanical logic system provides an indication to the operator of which magnification mode has been selected and automatically inhibits initiation of an exposure cycle if the slide and film unit are not in the corrected corresponding positions to provide a focused image of the slide on the film unit.

10 Claims, 7 Drawing Figures

VARIABLE MAGNIFICATION SLIDE COPY CAMERA

BACKGROUND OF THE INVENTION

The present invention relates to the field of photography and, more specifically, to a photographic copy apparatus or camera for previewing an original picture to be copied (e.g., 35 mm slide transparency) and projecting an enlarged image of the original picture onto a film unit for exposure.

Copy cameras that use self-developing film units for quickly and easily making enlarged prints from 35 mm slide transparencies are well-known in the prior art. For representative examples of these devices, see U.S. Pat. Nos. 2,866,380; 3,065,667; 3,697,175; 3,653,760; 4,082,446; and 4,200,392, along with commonly-assigned copending applications Ser. Nos. 152,744 and 152,858, both filed on May 23, 1980.

The last-mentioned patent and copending applications direct attention to the fact that the 24×36 mm image area format of a 35 mm slide (normalized width to height or length, 1×1.5) is not compatible on a direct enlargement basis with most standardized self-developing film units or conventional print paper formats which generally fall in a normalized format range of 1×1 to 1×1.4. For example, a 3.25"×3.25" self-developing film unit has a normalized format of 1×1, while 4×5 or 8×10 works out to be 1×1.25.

When a 35 mm slide image is to be printed on a standard size print paper or self-developing film unit, it is obvious that the projected image must be cropped in the long direction if the entire width of the film is to be used. Conversely, if the full 35 mm frame is to be printed, fitting the long dimension to the film format will result in black borders on the sides of the print because of the narrower normalized width of the slide format.

The copy devices disclosed in the aforementioned U.S. Pat. No. 4,200,392 and copending applications Ser. Nos. 152,744 and 152,858 take the approach that a cropped image which fits the entire print format is generally more aesthetically pleasing and the small loss of image area at the ends of the frame is tolerable in that for the most part it is confined to scene background which is most instances may be eliminated without loss of very much picture information.

However, there are many applications, especially in the technical, industrial, graphic arts and medical fields, where it is also important to be able to reproduce the entire 35 mm frame. Such applications may include providing an 8×10 enlargement of a tiny integrated circuit to inspect wire bonds and conductor continuity or reproducing data from the CRT of a CAT scan machine.

Thus, there is a need for a copy camera which can alternately provide either a full frame or cropped reproduction depending on the particular application. To switch between the full frame and cropped modes, there must be a corresponding change in image magnification. For example, to make an 8×10 enlargement of a full 35 mm frame, the image magnification factor is approximately 7.3× while a full width but shortened length cropped image is produced with an image magnification factor of approximately 9.9×.

Multiple magnification photographic copy devices, such as enlargers and graphic arts copy cameras, are well-known in the prior art. Because magnification is a function of the ratio of image-to-object distance and the focal length of the projection lens, there are many ways to vary magnification.

For example, if the same lens is to be used for different levels of magnification, then there must be some way to change the ratio of image-to-object distance. In devices using this technique, the object plane is usually fixed, and a lens and film holder are mounted for movement relative to each other and the object plane to adjust image size and focus. This type of structure requires guide rails, bellows, rack and pinion drives, etc., and is inherently expensive. Also, the operator must have some expertise or training to properly operate this equipment. For a representative example of such a device using this approach, see U.S. Pat. No. 3,645,620.

Another technique involves the use of interchangeable lenses or a zoom lens to vary focal length thereby allowing the image and object planes to be at a fixed distance from each other. A representative example of a copy device employing this method is disclosed in U.S. Pat. No. 4,184,763. Again, such a device is inherently expensive because it requires at least two different lenses or a costly zoom lens to change magnification. Also, the operator must be trained to change lenses or adjust the zoom lens.

Therefore, it is an object of the present invention to provide a multiple magnification copy apparatus or camera that is low in cost and easy to use.

It is another object to provide such copy apparatus that is operative to provide either a full frame or cropped reproduction of a 35 mm slide transparency on a film unit of a given format size.

It is yet another object to provide such a copy device wherein the operator may preview the slide and select the area to be cropped.

Another object is to provide such a copy device which includes a system for indicating which one of two different magnification modes has been selected and further includes a system for inhibiting operation when the slide and/or film is not in the correct position for the select level of magnification.

Other objects of the invention will, in part, be obvious and will, in part, appear hereinafter.

SUMMARY OF THE INVENTION

The present invention provides the photographic copy apparatus or camera which is operative in at least two different magnification modes for selectively varying the size of an image of an object projected onto a film unit. In the illustrated embodiment, the apparatus is a copy camera which is configured to make full frame or cropped reproductions of a 35 mm slide transparency on an 8×10 film unit, preferably of the self-developing type.

Substantial cost reduction is achieved by using a fixed focus lens mounted at a fixed position between alternative pairs of image and object positions.

In the illustrated embodiment, the film unit is configured to be provided in a light-tight cassette which is inserted into one of two different slots in the camera housing to support it at either a first or second film plane spaced at different predetermined fixed image distances from the lens where the film unit is replaceably supported for exposure to an image provided by the lens.

On the opposite side of the lens there are two different slide holders for defining alternative first and second object planes at different predetermined fixed object distances from the lens where the slide is supported alternatively for image projection. The image and object distance are selected so that an image of the slide located at the first object plane is focused at the first image plane and is of a size correlated to a first predetermined magnification factor and, alternatively, an image of a slide at the second object plane is focused at the second image plane and is of a size correlated to a second predetermined magnification factor that is different from the first magnification factor.

The camera also includes exposure control means that is operable to control transmission of image forming light rays from the object to the first and second film planes to effect exposure of a film unit thereat.

By sliding a control bar to either of its two terminal positions, the operator may select either full frame or cropped magnification. When full frame magnification is selected, the corresponding film plane slot is unblocked and the cropped film plane slot is blocked to prevent insertion of the cassette in the wrong slot. Also, the exposure control system is automatically adjusted to provide the correct exposure level for the selected magnification mode.

In the illustrated embodiment, the two slide holders are mounted on a sliding in mechanism for alternate movement into and out of the lens projection path. There are two preview windows, having lamps therebehind, corresponding to the two different magnification factors. When the slide bar is in the full frame position, the light behind the full frame preview window is turned on automatically, thereby indicating to the operator that he is to place the slide in the one corresponding slide holder that is locatable over the illuminated window.

An interlock system is provided which automatically disenables operation of the exposure control system if the operator places the slide in the wrong holder and introduces it into the image projection path or if the operator forgets to move the holder to locate a correctly positioned slide into the projection path.

BRIEF DESCRIPTION OF THE DRAWINGS

For a fuller understanding of the nature and objects of the invention, reference should be had to the following detailed description taken in conjunction with the accompanying drawings wherein.

DESCRIPTION OF THE PREFERRED EMBODIMENT

Figure 1:
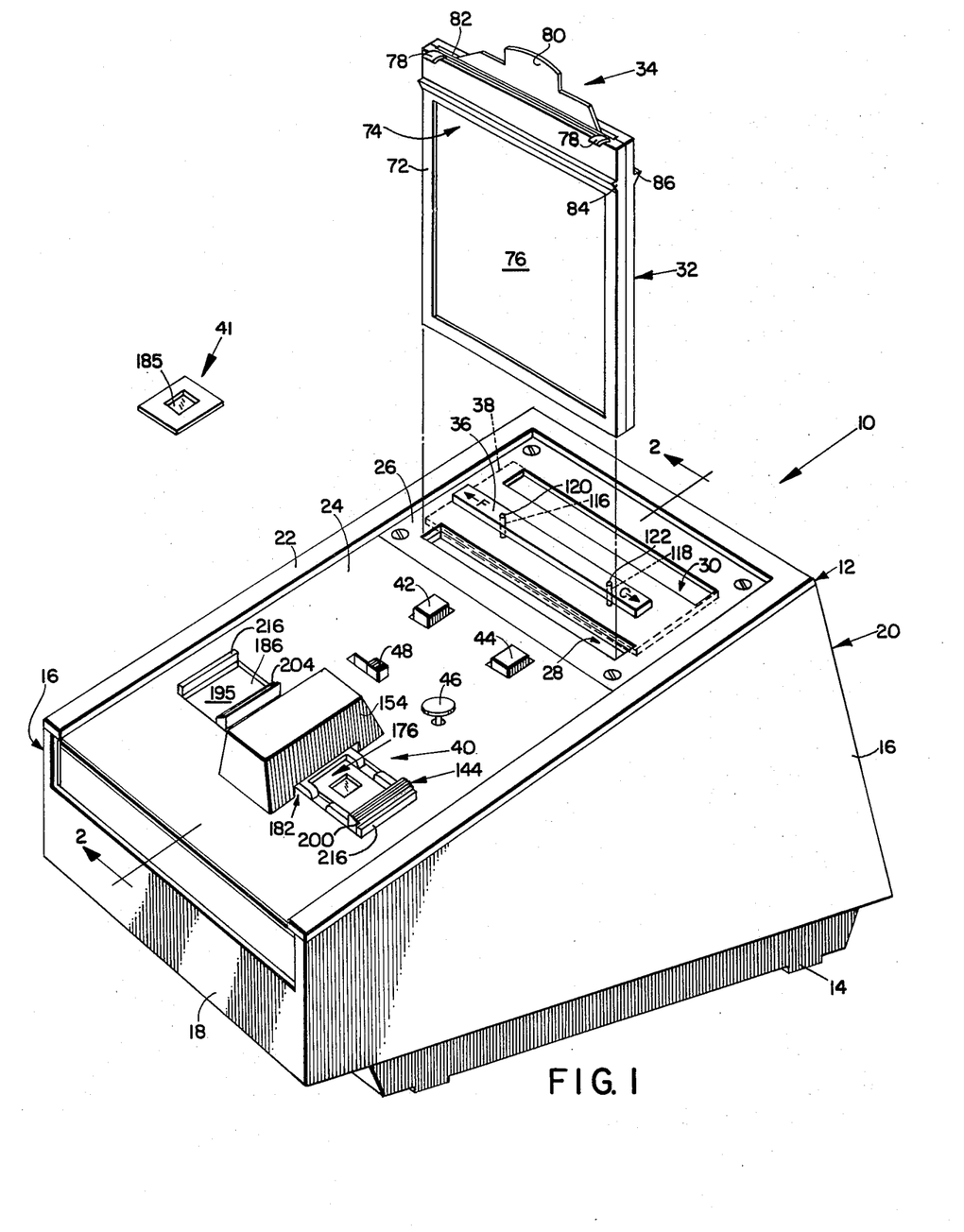
FIG. 1 is a perspective view of a photographic copy apparatus embodying the present invention and a slide transparency and film holding cassette adapted to be slidably inserted into the copy apparatus.
Figure 2:
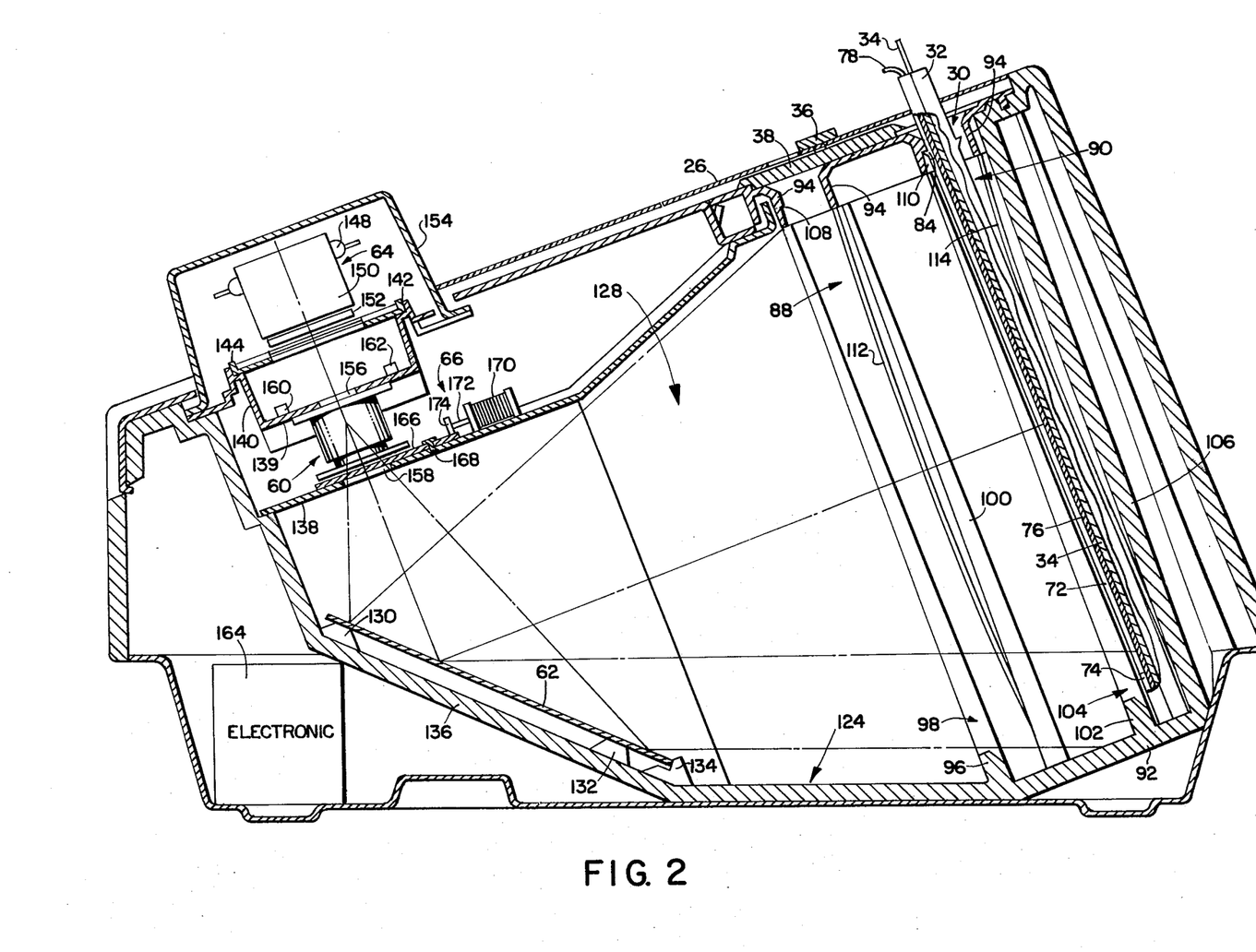
FIG. 2 is a longitudinal cross-sectional view of the apparatus of FIG. 1 taken along lines 2—2.

FIGS. 1 and 2 show a multiple magnification photographic copy apparatus or camera 10 embodying the present invention. In this illustrated embodiment, camera 10 is configured for making enlarged full-frame or selectively cropped reproductions of a 35 mm slide transparency on a 8×10 photosensitive sheet, such as the negative sheet of a self-developing film unit or conventional print paper of this size.

Camera 10 has a generally box-like housing 12 comprising a lower supporting base section 14 and an upper housing section defined by a plurality of generally planar walls including a pair of side walls 16, a forward end wall 18, a rear end wall 20 and a top wall section comprising a peripheral frame portion 22, a forward cover panel section 24 and a rear cover panel section 26. These walls and panel sections may be formed of a suitable material that is opaque to achieve radiation with molded thermoplastic being preferred for mass production.

Panel section 26 has a pair of laterally extending and longitudinally spaced slots or openings 28 and 30 therein through which a cassette 32 holding a photosensitive sheet 34 is inserted to locate the cassette in alternative later-to-be-described receiving chambers within housing 12. For a full frame reproduction, cassette 32 is inserted through the forward slot 28 so that the image distance is set for a 7.3× magnification factor. If a cropped image is desired, cassette 32 is inserted through the rear slot 30 to increase the image distance to the film unit to provide a magnification factor of 9×.

Located between slots 28 and 30 is a slide bar 36 which when moved to one of its terminal position indicated by the arrow F (for full frame) effects sliding movement of a cooperating cover plate 38, underlying panel 26, in the longitudinal direction to simultaneously unblock slot 28 and block slot 30. When slide bar 36 is moved in the opposite direction indicated by arrow C (for cropped) to its other or second terminal position, underlying cover panel 38 moves in the opposite direction to block slot 28 and unblock slot 30. Thus the operator may select either the full frame or cropped magnification mode by moving the slide bar 26 as indicated to unblock the corresponding slot for the selected magnification mode while at the same time blocking the other slot so as to preclude insertion of the cassette 32 into the wrong slot for the selected mode.

The forward cover panel 24 serves to cover and selectively provide access openings for components of a slide holder and preview station assembly 40 for selectively receiving a typical 35 mm slide transparency 41 mounted in a cardboard or plastic 2"×2" mount, and mounts various control switches and devices including a power on/off switch button 42, an exposure cycle actuator button 44, a lighten/darken trim wheel 46 and a film speed selector slide switch 48.

In the illustrated embodiment, camera housing 12 is preferably, for the most part, or molded plastic construction and is adapted to fit on a table top with the underside of base section 14 resting thereon. It will be noted that the top wall section of housing 12 is inclined downwardly from the rear to the forward end at a convenient angle for an operator sitting at the table and facing the forward end of camera 10 to easily see and reach the various controls and manipulate cassette 32 during insertion into and withdrawal from the alternative later-to-be-described receiving chambers.

Figure 3:
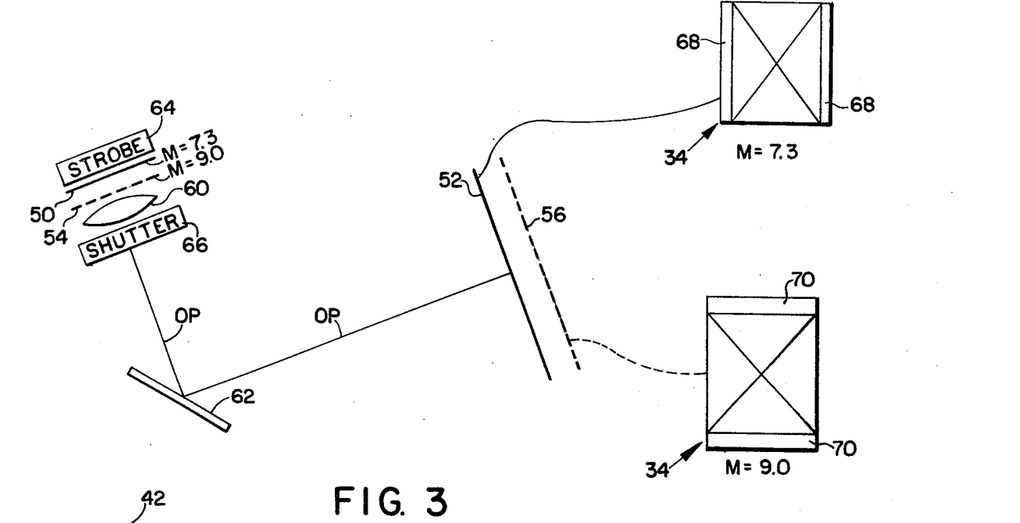
FIG. 3 is a diagrammatic representation of the camera embodying the present invention along with sketches showing projected image areas versus film areas for two different magnification factors.

The image projection and exposure control systems of camera 10 are shown diagrammatically in FIG. 3. For the full frame or 7.3× magnification mode, the slide 41 to be copied is located at a first image plane 50 and the film unit 34 is located at a corresponding first image plane 52 (both indicated by solid lines). In the alternative higher magnification (9×) cropped image mode, the slide 41 is located at a second image plane 54 and the film unit 34 is located at a corresponding second image plane 56 (both shown in dotted lines). These image and object planes are in optical alignment with, and transverse to, an optical path, OP, defined in part by a fixedly mounted fixed focus projection lens 60 which is folded between lens 60 and the image planes by means of a mirror 62. The optical path is folded for reasons of fitting the image projection system into the preferred illustrated shape of housing 12 while at the same time minimizing dimensions of housing 12 to keep camera 10 relatively compact in relation to image size.

A slide transparency 41 located at either object plane 50 or 54 is preferably illuminated by a strobe flash unit 64 which operates in conjunction with an electronically controlled capping blade shutter 66 positioned between the object planes and lens 60 for controlling the transmission of image forming light during a film exposure interval.

Because lens 60 has a given focal length and its position is fixed, magnification M can be changed by adjusting the ratio of image distance (V) to object distance (U). This is, $M=V/U$. In the illustrated embodiment, lens 60 has a focal length of approximately 40 mm. For 7.3× magnification, the distance from object plane 50 to the rear nodal point of lens 60 is approximately 45.5 mm; and the object distance from lens 60 to object plane 52 is approximately 332 mm. For 9× magnification, the distance from object plane 54 to the rear nodal point of lens 60 is approximately 44.5 mm and the object distance to the second object plane 56 is approximately 400 mm.

In the full frame projection mode (7.3×), the projected image fills the long dimension of the film unit format but leaves relatively wide unused borders 68 at the sides of film unit 34. In the cropped image mode, the entire image area of the film unit 34 is filled but those portions at the top and bottom of the image frame designated 70 are lost through cropping. As will be explained later, the cropping may be all at one end or adjusted in a continuous manner to exclude an area equal to the total of the upper and lower portions 70.

As best shown in FIGS. 1 and 2, cassette 32 is preferably of the conventional type used in 8×10 view cameras and includes a rectangular exposure aperture 72 in its forward wall 74. Initially, aperture 72 is blocked by a conventional dark slide 76 which may be moved to the unblocking position by lifting upwardly on tab 78 protruding from a dark slide channel at the upper end of cassette 32.

In the illustrated embodiment, film unit 34 is the negative photosensitive sheet of a self-developing film unit and includes a manipulation tab 80 at its upper end which protrudes through a film exit slot 82. Following exposure, the cassette 32 is inserted into a large format self-developing film processor where tab 80 is joined with a corresponding tab on the positive sheet. The coupled tabs are fed between the bite of a pair of pressure-applying rollers which are rotatably driven to advance the superposed negative and positive sheets therebetween to effect distribution of a fluid processing composition, carried in a rupturable pod on the positive sheet, therebetween to initiate a well-known development and diffusion transfer process. Following a suitable imbibition period, the positive and negative sheets are peeled apart to reveal the developed positive image.

A self-developing color film unit suitable for use with cassette 32 is disclosed in U.S. Pat. No. 4,009,031. For a representative example of a suitable processing apparatus, see commonly-assigned U.S. Pat. No. 4,019,194.

Cassette 32 additionally includes standard laterally extending locating ribs 84 and 86 on its forward and rear sides respectively. These ribs are utilized to mate with corresponding channels on various 8×10 cameras for the purpose of accurately locating the cassette so that the exposure aperture 72 is in registration with a corresponding exposure aperture at the back end of such cameras. As best shown in FIG. 2, a cassette 32 loaded with a film unit 34 is adapted to be received in either a forward receiving chamber 88 aligned with the forward access slot 28 or a rear receiving chamber 90 aligned with the rear access slot 30.

The forward and rear receiving chambers 88 and 90 are similar in construction and portions of their structure serve as means for supporting the cassette 32 at an operative position therein whereby the photosensitive sheet 34 is automatically located at the first image plane 52 in first receiving chamber 88 or at the second image plane 56 in the second receiving chamber 90.

Extending upwardly from an inclined common chamber bottom wall 92, in base section 14, through the bottom of a molded plastic cap 94 defining interior portions of access openings 28 and 30 is an apertured frame 96 having a central opening 98 therein of the same or slightly larger size than the exposure opening 72 in cassette 34 and defining a forward cassette supporting wall in chamber 88; a pair of rearwardly spaced ribs 100 on the interior of opposing side walls 16 which cooperate with the lateral edge portions of frame 96 to define a pair of channels for slidably receiving the lateral edge portions of cassette 32 in chamber 88; a second apertured frame 102 defining the forward cassette supporting wall of chamber 90 and having a central aperture 104 therein; and a rear wall 106 spaced from frame 102 and in cooperation therewith to define side channels for slidably receiving the lateral edge portions of cassette 32 in the second receiving chamber 90.

When cassette 32 is fully inserted into either chamber 88 or 90, the bottom end thereof rests on the interior surface of bottom wall 92 and the forward wall 72 is located in abutting relation to the rearwardly facing support and locating surface of frame 96 or 102.

In a preferred embodiment, the cap 94 is provided with integrally formed notches 108 and 110 in the entranceways to chambers 88 and 90 for releasably capturing the forward locating rib 84 on cassette 32. Also, elongated leaf springs 112 and 114 are provided, respectively, on ribs 100 and the lateral sides of wall 106 for engaging the rear wall of cassette 32 to urge it forwardly into firmly abutting relation with the corresponding cassette locating surfaces on the rearward side of apertured frames 96 and 102. This construction allows the cassette 32 to be tilted rearwardly to disengage cassette rib 84 from the notches 108 and 110 in preparation for removing the cassette from chambers 88 or 90. When the cassette 32 is inserted into one of the receiving chambers, the forward biasing of the springs causes the rib 84 to snap into the corresponding notch 108 and 110, thereby providing a reassuring "click" that indicates to the operator that the cassette 32 is at its fully inserted operative position.

The above-described structure in chambers 88 and 90 for supporting and accurately locating cassette 32 therein also serves as means for defining the first and second image planes 52 and 56 in their respective receiving chambers 88 and 90 because the position of the film unit 34 within the cassette 32 is fixed at a known distance behind forward wall 72 by conventional support structure in the cassette as is well known in the photographic art.

As noted earlier, the camera operator selects either the full frame or cropped magnification mode by moving the slide bar 36 to effect longitudinal movement of a cover plate 38 to unblock the opening in the corresponding chamber and to simultaneously block the opening in the inappropriate chamber. Cover plate 38 is slidably mounted between the upper end of cap 94 and the interior side of top wall section 26 and includes a pair of diagonal slots 116 and 118 (see FIG. 1) therein for respectively receiving cooperating drive pins 120 and 122 depending from the underside of slide bar 36 for effecting longitudinal movement of cover plate 38 in response to lateral movement of the slide bar 36.

As best shown in FIG. 2, a cone-like structure 124, preferably of molded plastic construction, within camera housing 12 defines a major portion of a light excluding exposure chamber 128 extending between lens 60 and apertured frame 96, and also mounts certain components thereon including the mirror 64 attached to supports 130, 132, and 134 on inclined wall portion 136 and the shutter 66 mounted on a planar wall section 138 spaced below the lower end of lens 60.

The projection lens 60 is fixedly secured to the underside of bottom wall 139 of a support member 140 that is secured to bosses (not shown) extending upwardly from surface 138 of housing 12 and includes adjacent thereto a laterally extending channel 142 for slidably receiving a movable dual slide holder 144 to be described in detail later. Aligned with the optic axis of lens 60 and located above holder 144 is the electronic strobe unit 146 for illuminating the slide transparency 41 during the course of an exposure interval.

Figure 4:
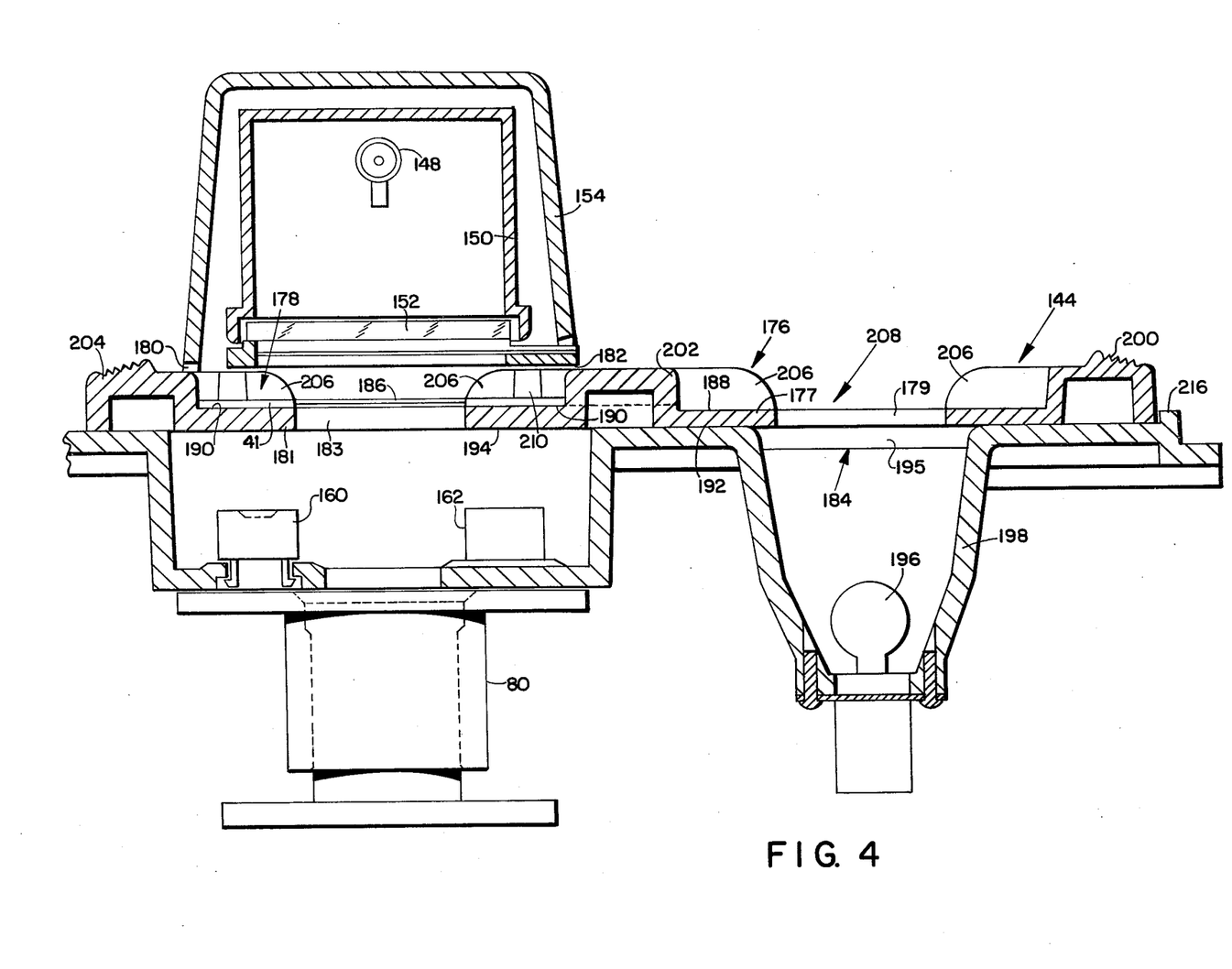
FIG. 4 is a lateral cross-sectional view of a portion of the slide holder and image projection station.

As best shown in FIGS. 2 and 4, strobe unit 64 includes a flash tube 148 mounted in a generally rectangular reflector 150. In a preferred embodiment, an opal glass 152 is mounted between the open bottom end of reflector 150 in the slide holder 144 for diffusing light from the strobe unit 64 to promote more uniform illumination of the transparency 41 located at a later-to-be-described projection position. The strobe unit 64, opal glass 152 and the middle portion of support member 140 holding slide holder 144 are covered by a dome-like cover 154 secured to adjacent bosses of housing 12.

The strobe unit 64 is preferably of a quenchable type having a rectangular reflector 150 that is dimensioned and constructed in accordance with the teachings of a commonly-assigned copending application U.S. Ser. No. 266,082 filed on May 21, 1981, to promote more uniform illumination, said copending application being incorporated by reference herein.

Image forming light rays emanating from the slide illuminated by strobe unit 64 passes through an aperture 156 in support member wall 139, through lens 60 and an aligned opening 158 in wall 138 to mirror 62. Mirror 62 redirects the image forming light towards the sequential image planes 52 and 56 defined in receiving chambers 88 and 90 respectively.

In a preferred embodiment, exposure of the photosensitive film unit is controlled by detecting the brightness of the light transmitted through the slide 41 with a pair of upwardly facing photocells 160 and 162 mounted on support member 140. These photocells 160 162 form part of a light integrating network in an electronic exposure control circuit which provides a trigger signal for quenching the strobe unit 64 when a predetermined quantity of light has been transmitted through the slide 41. The electronic exposure control circuit and other electrical systems forming part of camera 10 are provided in an electronics module 164 mounted in base section 14 behind inclined wall 136.

The exposure interval is controlled by the strobe flash interval which will vary with the density of the slide as indicated by the brightness output detected by photocells 160 and 162. Therefore, camera 10 requires only a simple capping blade shutter for selectively blocking and unblocking aperture 158 to provide a light seal for exposure chamber 128 rather than precisely defining the exposure interval.

In the illustrated embodiment, shutter 66 comprises a capping blade 166 which is positioned between the lower end of lens 60 and aperture 158 and is mounted for pivotal motion about a pin 168 in wall 138 between positions blocking and unblocking aperture 158. In the illustrated embodiment, such pivotal motion is provided by a solenoid 170 mounted on wall 138 and having its retractable plunger 172 attached to an upstanding post 174 on blade 166 that is offset from the pivot axis of blade 166. A spring coiled about plunger 172 maintains it in its extended position when solenoid 170 is unenergized to thereby locate a shutter blade 166 in its normal blocking position. In response to the initiation of a film exposure cycle, the automatic exposure control system will energize solenoid 170 to retract plunger 172 and thereby pivot blade 166 to its unblocking position. Then the strobe 64 will be fired and subsequently quenched to establish the exposure interval. Following the provision of the quench signal, solenoid 170 will be automatically deenergized and the plunger 172 will extend outwardly and pivot blade 166 back to the blocking position.

Figure 5:
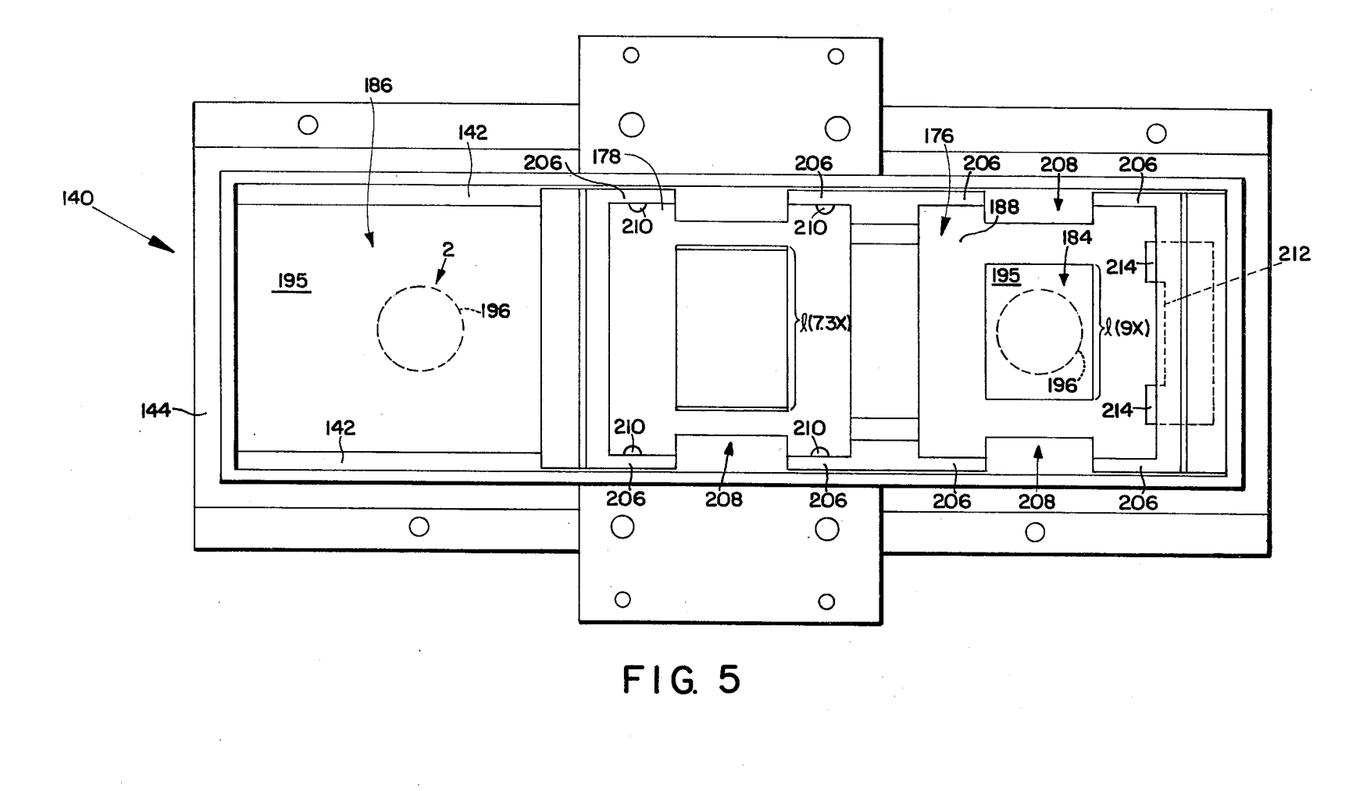
FIG. 5 is a plan view of selected components of the slide holder assembly.

The movable slide holder 144 is shown in more detail in FIGS. 4 and 5. In the illustrated embodiment, holder 144 is a molded plastic piece part that includes a first slide holding compartment 176 on its right-hand side that is used in the 9× cropped image mode of operation, and a second slide holding compartment 178 on its left-hand side for use during the 7.3× full frame magnification mode of operation.

With the lateral edges of holder 144 slidably supported in the opposed channels 142 in support member 144, it may be manually moved by the operator transversely through opposed openings 180 and 182 in the lower portion of dome cover 154 between the illustrated right-hand terminal position shown in FIGS. 1, 4 and 5, wherein the first compartment 176 is aligned with a first backlighted slide preview station 184 and the second compartment 178, having a slide transparency 41 therein, is within the dome cover 154 at an image projection station where the image frame of slide 39 is in alignment with lens 60 and spaced from the rear nodal point thereof a predetermined distance for 7.3× magnification in preparation for an exposure cycle. Movement of slide holder 144 in the opposite direction to its second terminal position locates the first compartment 176 at the projection position and the second compartment 178 in alignment with a second backlighted preview station 186 on the left-hand side of dome cover 154 as best shown in FIG. 1.

As noted earlier with reference to FIG. 3, the slide 41 is to be located at the first object plane 50 for 7.3× magnification or, alternatively, at the second object plane 54 for 9× magnification which is closer to the lens 60 than the first object plane 50.

As best shown in FIG. 4, locating a slide 41 at these alternative object planes is accomplished by a differential in spacing between the horizontal slide support surfaces 188 and 190, respectively, of compartments 176 and 178.

In the illustrated embodiment, the spacing differential is achieved by providing different wall thicknesses of the horizontal bottom walls in compartment 176 and 178. It will be noted that the bottom surfaces 192 and 194 of compartments 176 and 178 lie in a common plane and provide a reference distance to the rear nodal point of lens 60. However, the upper support surfaces 188 and 190 have different heights relative to these reference surfaces. That is, the thinner bottom wall section of compartment 176 locates the top surface 188 closer to the rear nodal point of lens 60 than the corresponding surface 190 in compartment 178 which is further away from this reference surface.

When a slide 41 is at its operative position in compartment 178, it is supported at the higher object plane 50 and when slide 41 is supported in compartment 176, it is automatically located at the lower object plane 54. Thus, the horizontal support surfaces 188 and 190 serve the functions of supporting the slide at an operative position for projection and at the same time, by their locations relative to the rear nodal point of lens 60, defining the first and second object planes 50 and 54.

The first compartment 176 includes a bottom horizontal wall section 177 between exterior surfaces 188 and 192 having a central aperture 179 therein corresponding to the cropped format image area while the second compartment 178 includes a bottom wall section 181 between surfaces 190 and 194 having a central opening 183 therein that is of the same 24×36 mm size as the image area 185 of a 35 mm slide 41.

It should be noted that the location of the slide 41 is changed in response to transverse motion of the slide holder 144 relative to the optic axis of the lens along a single plane defined by the coplanar surfaces 192 and 194 riding along the channels 142. Thus, slide position is shifted between the alternative object planes without having to provide a mechanism that has to be precisely moved in a direction parallel to the optic axis thereby eliminating the expense associated with precision mechanisms for effecting such movement.

The holder 144 may be adapted for use with both cardboard and glass mounted slides by providing removable inserts or spacers that are positioned over surfaces 188 and 190 for the thinner cardboard mounts and are removed when the thicker glass mounts are to be placed in the holder.

The first and second preview stations 184 and 186 are formed by translucent plastic windows 195 in top wall section 24 which are backlighted by small incandescent lamps 196 positioned in lamp enclosures 198 surrounding each of the preview stations 184 and 186.

As best shown in FIG. 5, the length, (9×), of the opening of compartment 176 is shorter than the length, (7.3×), of the full frame opening 183 in compartment 178 to mask or block light transmission through those selected portions of the transparency frame that are to be cropped. The width of openings 179 and 193 are the same and equal to the width of the transparency frame 185.

As best shown in FIGS. 1 and 4, compartment 174 is bounded on its right-hand end by an upstanding push bar 200 and on its left-hand end by an upstanding center rib 202. A similar push bar 204 on the opposite end of holder 144 cooperates with center rib 202 to define the lateral boundaries of compartment 178. Short upstanding side wall sections 206 extending toward the center of compartments 176 and 178 from the corresponding push bars 200 and 204 and center rib 202 border the longitudinal sides of these compartments. Spaces 208 are left between aligned pairs of wall sections 206 to provide access for gripping the longitudinal edges of the slide mount to facilitate insertion into and withdrawal of the slide 41 from compartments 176 and 178.

Four integrally formed button-like stops 210 on the interior surfaces of the wall sections 206 of compartment 178 define the longitudinal dimensions thereof and are engageable by the longitudinal edges of the slide mount to accurately position the slide longitudinally with respect to the full frame opening 183. Lateral position is controlled by the engagement of the side edges of the slide mount with the inwardly facing vertical surface of rib 202 and push bar 204.

The structure of compartment 176 is a little different. The slide mount is centered laterally with respect to the shorter opening 175 by the inwardly facing vertical engagement surfaces of rib 202 and push bar 200, but limited movement in the longitudinal direction is permitted by elimination of corresponding stops 210 so that the operator may move the image area 185 of the slide 41 relative to the opening 179 and frame that portion thereof which he selects for reproduction. That is, the operator may choose to crop one longitudinal end of the image and therefore would move the slide mount so that the adjacent longitudinal edge of the mount is in abutting relation with the interior surfaces of the facing wall sections 206. Moving the slide mount longitudinally through selected intermediate positions will effect cropping from both ends in the proportion selected by the operator.

To releasably hold the slide 41 in the selected longitudinal position, the illustrated slide holder 144 is provided with a spring element 212 mounted in push bar 200 (shown in FIG. 5 only) and having a pair of resilient fingers 214 that extend into compartments 176 over its bottom wall upper surfaces 188. With the right-hand lateral edge of the slide mount inserted thereunder, the downward bias of fingers 214 press this edge of the slide mount against surface 188 thereby inducing sufficient friction to releasably retain the slide 41 at the desired longitudinal location.

To accurately locate the slide holder 144 in each of its two terminal positions, upstanding ribs 216 are provided on wall section 24 in the path of travel of the corresponding push bars 200 and 204 and serve as locating stops against which the outboard ends of these pushbars bear as best shown in FIGS. 1 and 5.

Camera 10 also includes an electromechanical logic and control system that is responsive to the locations of slide bar 36 and slide holder 144 for 1) indicating when slide bar 36 is correctly located at one of its two terminal positions to insure that cover 38 fully unblocks the corresponding one of the cassette entry slots 28 and 30;

2) clearly indicating which one of the two slide holding compartments 176 and 178 is to be used for the selected magnification mode indicated by the position of slide bar 36; and 3) inhibiting actuation of an exposure cycle until the operator correctly positions the slide holder 144 to locate the corresponding compartment at the image projection station within the dome cover 154.

Figure 6:
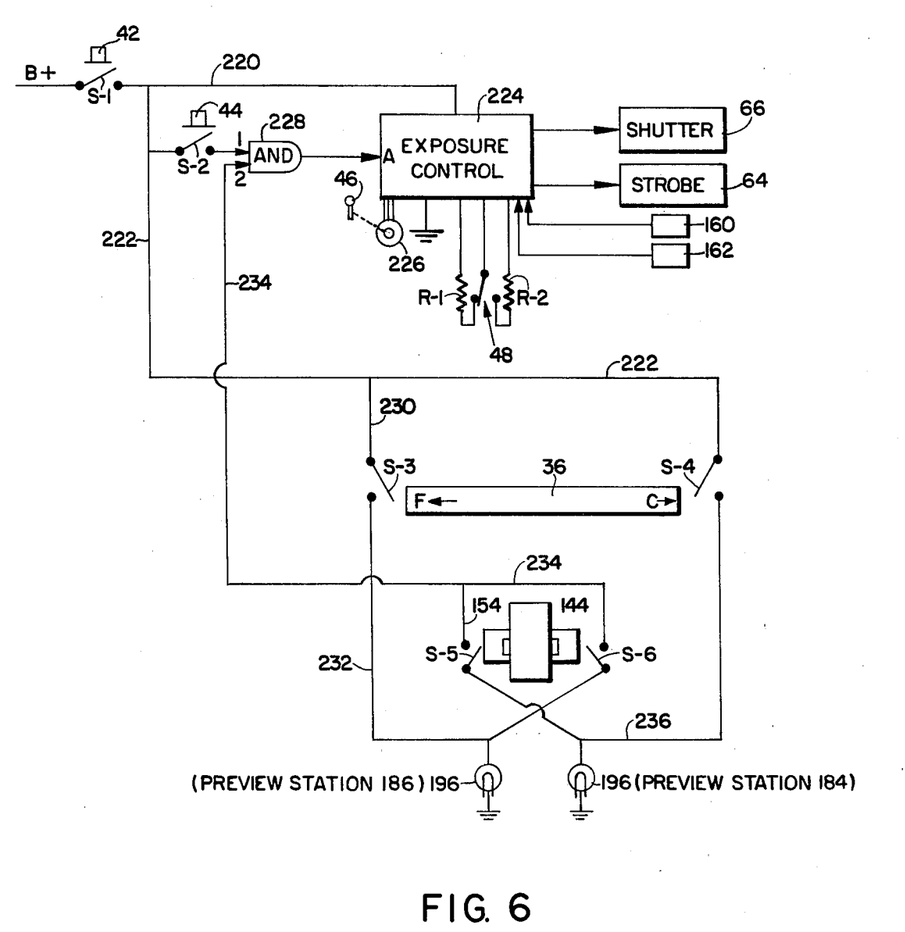
FIG. 6 is a functional block diagram of the camera electronic logic and interlock system with the slider bar and slide holder at an intermediate or neutral position.
Figure 7:
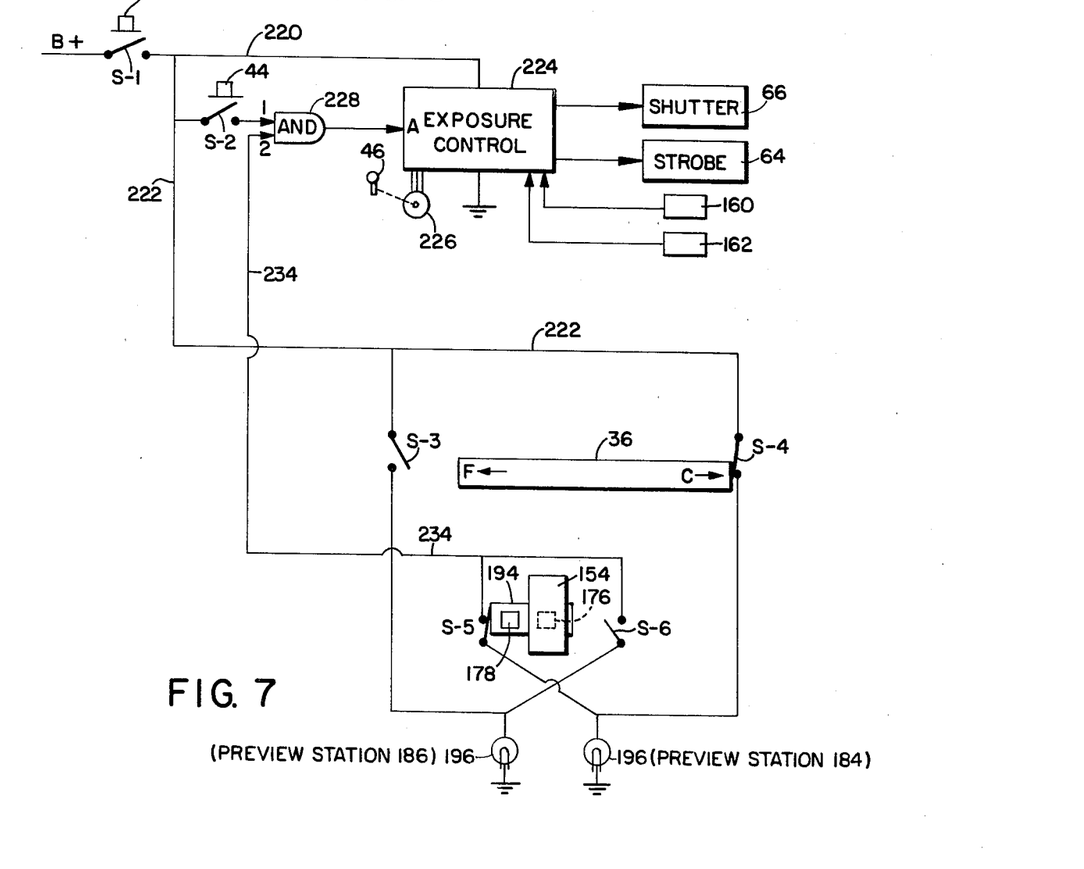
FIG. 7 is similar in some respects to FIG. 6 but shows the result of moving the slide bar and holder to selected operative positions.

This system is shown diagrammatically in FIGS. 6 and 7. B+ voltage is provided along supply lines 220 and 222 in response to the closing of a normally open switch S1 when the operator pushes downwardly on power switch button 42. Line 220 provides electrical power to an exposure control circuit 224 which, when actuated in response to a pulse input signal at terminal A thereof, automatically controls operation of shutter 66 and strobe unit 64.

As noted earlier, shutter 60 is opened by energizing solenoid 170 and then strobe unit 64 is fired. The photocells 160 and 162 facing the illuminated slide image area 185 provide inputs to the light integrating subcircuit of circuit 224 which provides a trigger signal to quench the light output of strobe unit 64 when optimum exposure value has been obtained. The response of the light integrating subcircuit and circuit 224 may be varied to lighten or darken the print by adjusting a potentiometer 226 coupled to trim wheel 46. Movement of the film speed selector switch 48 will alternatively connect either R1 or R2 (different valued resistors) to adjust the response of circuit 224 for the selected one of two different film speeds. Alternatively, appropriate neutral density filters may be moved into position over the photocells to adjust the response of circuit 224.

Automatic exposure control circuits suitable for use in camera 10 which perform the functions described or any additional functions that may be desired and include the capability of being adjustable for operation with a wide range of different film speeds are well known in the photographic art and need not be described further to understand the present invention.

An actuating pulse is provided to terminal A of circuit 224 through AND gate 228 when normally open switch S2, coupled between supply line 222 and input 1 of gate 228, is closed in response to the operator pushing down on button 44 and there also is a logic 1 or high level voltage signal at enabling terminal 2 of gate 228. That is, gate 228 is enabled to pass the actuating signal to terminal A only when there is a gate enable signal (logic 1) at terminal 2. As will become apparent, this enabling signal will be provided only when there is a correct combination of positional settings for the slide bar 36 and the slide holder 144. When these settings are not correct, a logic 0 or low level voltage signal is provided at terminal 2 of gate 228, thereby disenabling the gate and inhibiting actuation of circuit 224 in response to closing switch S2.

The enabling and inhibiting logic is provided by a first pair of normally open microswitches, S3 and S4, which detect the position of slide bar 36; and a second pair of microswitches, S5 and S6, that are utilized to detect the position of slide holder 144.

Switch S3 has one terminal connected to supply line 222 over connecting line 230 and a second terminal connected over line 232 to one side of switch S6. The other side of switch S6 is connected over line 234 to input terminal 2 of gate 228. The lamp 196 at the full frame (7.3×) preview station 186 has one side connected to line 232, between switches S3 and S6, and the other side is grounded.

The opposite side of the switch logic is similarly arranged with switches S4 and S5 connected in series between supply line 222 and the return line 234 to enabling terminal 2 of gate 228. The lamp 196 at the cropped (9.3×) preview station 184 is connected between switch connecting line 236 and ground.

The switches S3 and S4 are positional limit switches which may have leafspring actuator arms that are located at opposite ends of the path of travel of slide bar 36 so as to be engaged by the opposite corresponding ends thereof. When slide bar 36 is in between its two terminal positions, there is no engagement with the switch actuators and both switches S3 and S4 remain in their normally open nonconductive state as shown in FIG. 6. However, when slide bar 36 is moved to its right side terminal position, shown in FIG. 7, thereby selecting the cropped (9×) format and effecting the unblocking of the corresponding cassette receiving chamber opening 30, the right-hand end of slide bar 36 engages and closes switch S4 thereby energing the lamp 196 at the corresponding right-hand preview station 184. Switch S3 remains open when slide bar 36 is in this position so that lamp 196 at preview station 186 is not energized at this time. If slide bar 36 is moved to its opposite left-side terminal position (see FIG. 1) for the selection of the 7.3× full frame image projection mode, S3 is closed thereby energizing lamp 196 at the corresponding preview station 186 and switch S4 is open.

Therefore, if the operator turns on the power switch S1 and neither of the preview stations is illuminated, he is provided with a positive indication that the slide bar 36 is between its terminal positions and must be moved either to the left for full frame image projection or to the right for cropped image projection. Once this is done, the corresponding preview station will be illuminated providing him with a positive indication of which magnification mode has been selected and which way to move the slide holder 144 to align the correct slide receiving compartment therein over the illuminated preview station.

The switches S5 and S6 also are positional limit switches that are engageable by the opposite ends of the slide holder 144. When holder 144 is between its terminal positions, as shown in FIG. 6, neither switch S5 and S6 is engaged and they remain in their normally open nonconductive state. With holder 144 at its left side terminal position (shown in FIG. 7), locating compartment 178 over preview station 186 and compartment 176 holding a slide 41 at the image projection station in dome cover 154 where the image area 180 of slide 41 is aligned with the strobe flash unit 64 and the projection lens 60 therebelow, S5 is closed and S6 is opened.

If both of the series connected switches S4 and S5 are closed, the high voltage level or logic 1 signal from supply line 222 will be provided over line 234 to the enabling input terminal 2 of gate 228 thereby enabling the initiation of an exposure cycle in response to closing switch S2. But, if either switch S5 or S4 is opened, indicating that slide bar 36 or slide holder 144 is not in its correct corresponding position, then the electrical path from supply line 222 to the enabling terminal 2 of gate 228 will be opened so that terminal 2 will be at a logic 0 level thereby inhibiting initiation of exposure cycle in response to closing switch S2.

The series connected switches S3 and S6 provide the same enabling and inhibiting logic on the opposite side. If slide bar 36 is at the left side terminal position, S3 is closed. To enable operation of the exposure system, the slide holder 144 would have to be at its right side terminal position to close switch S6.

With reference to FIG. 7, suppose the slide bar 36 is at its illustrated position closing switch S4 but the holder 144 is in the opposite terminal position closing S6 and opening S5. The lamp 196 at preview station 184 (cropped mode) will be energized, but the enabling signal will not be provided through the closed switch S6 or over return line 234 because both switches S3 and S5 are open.

Now, let's assume that the operator has loaded a film unit into cassette 32 and wants to make a cropped reproduction of the image area 185 of slide 41. Also assume camera 10 is set up as it is shown in FIG. 1 with the slide bar 36 at the left side full frame position and slide holder 144 at its right side terminal position. With the slide bar 36 located in this position, the S3 switch is closed causing the left-side preview station 186 to be illuminated. Also, cover 38 is positioned to unblock the full frame (7.3×) cassette access opening 28 and to simultaneously block the rear chamber access opening 30.

To prepare camera 10 for the cropped image mode of operation, the operator manually moves slide bar 36 from the left terminal position shown in FIG. 1 to the right terminal position shown in FIG. 7. In response to such movement, the cover 38 moves downwardly to unblock slot 30 and block slot 28. Also, switch S3 is opened, extinguishing the light at preview station 186, and S4 is closed illuminating the corresponding right side preview station 184. In FIG. 1, the slide holder 144 is already at its right terminal position locating compartment 176 over preview station 184. Therefore, switch S5 is open and switch S6 is closed, thereby inhibiting the initiation of an exposure cycle.

The operator loads the film cassette 32 into the rear chamber 90 through access slot 30 and places the slide 41 to be copied in compartment 176. While viewing the slide at preview station 184, he may move it longitudinally to select the desired portion to be reproduced. The spring element 212 will releasably retain the slide in the selected position. Then, the slide holder 144 is moved to its lefthand terminal position to locate the slide 41 in compartment 176 at the image projection station as shown in FIG. 7. This movement of holder 144 causes switch S6 to open and effects the closing of switch S5. Now, both of the series connected switches S4 and S5 are closed to provide a logic 1 signal at enabling terminal 2 of AND gate 228. At this point, the film can be exposed to a projected image of the slide by pressing downwardly on button 44 to close switch S2. Following the automatically controlled exposure interval, slide holder 144 is moved back to its right side terminal position so that slide 41 may be removed from compartment 176. Cassette 32 is removed from rear chamber 90 and transferred to a suitable large format processing device where the exposed negative sheet is coupled with a positive sheet for advancement between a pair of pressure applying rollers to effect the distribution of a processing composition between the superposed sheets. Following a suitable imbibition period, the sheets are peeled apart to reveal a positive image on tme positive print sheet.

Should the operator event want to change to the 7.3× full frame image projection mode, he merely slides the bar 36 back to its left side terminal position to unblock slot 30 and effect the illumination of the corresponding preview station 186. This indicates that he should now use compartment 178 in slide holder 144 for making the 7.3× reproduction.

Those skilled in the art will appreciate that when the magnification is changed, a corresponding change in exposure will have to be made to compensate for the difference in the intensity of image forming light incident upon the two different film planes due to differences in distance and the variation in angular spread of the image projection. Therefore, although not shown in the drawings, camera 10 is provided with means for increasing exposure for the higher magnification and for decreasing exposure for the lower magnification. This can be accomplished by having a resistor switched into the light integration circuit in response to closure of switch S3 to change the trigger level at which the strobe is quenched.

Although not shown or described herein, the copy camera 10 embodying the present invention may also additionally include a contrast control system of the type disclosed in commonly-assigned U.S. Pat. No. 4,272,186.

Since certain changes may be made in the above-described copy apparatus without departing from the scope of the invention herein involved, it is intended that all matter contained in the above description or shown in the accompanying drawings shall be interpreted as illustrative and not in a limiting sense.

What is claimed is:

1. A copy camera operative in at least two different magnification modes for selectively varying the size of an object projected onto a film unit, said copy camera comprising:

a support member;

a projection lens, having a given focal length, mounted at a fixed location on said support member;

means for supporting a film unit alternatively at either of first and second film planes spaced at different predetermined fixed image distances from said lens for exposure to an image provided thereby;

means for supporting an object alternatively at either of first and second object planes spaced at different predetermined fixed object distances from said lens, said different image and object distances being selected so that in one magnification mode an image of an object located at said first object plane is focused by said lens at said first film plane and is of a size predetermined by a first magnification factor and in another magnification mode an image of an object located at said second object plane is focused at said second film plane and is of a size predetermined by a second magnification factor that is different than said first magnification factor; and exposure control means operable for controlling transmission of image forming light rays from an object at either of said first and second object planes to a corresponding one of said first and second film planes to effect exposure of a film unit thereat.

2. The copy camera of claim 1 wherein said film unit supporting means is mounted on said support in fixed relation to said lens and said object supporting means is mounted on said support for movement relative to said lens between first and second object plane supporting positions.

3. The copy camera of claim 2 wherein said object supporting means is movable in directions transverse to the optic axis of said lens.

4. The copy camera of claim 1 further including mode selector means for setting said camera for operation in said one or another magnification modes and means responsive to the setting of said mode selector for enabling operation of said camera when the film unit and object are locatable at corresponding film and object planes to provide a focused image and for disenabling such operation when the film unit and object are not locatable at corresponding film and object planes to provide a focused image.

5. The copy camera of claim 4 further including a camera housing having first and second openings therein respectively providing access for locating a film unit at or withdrawing it from said first and second film planes, and means responsive to operation of said mode selector means for unblocking the one opening corresponding to the selected magnification mode while blocking the other said opening to prevent insertion of the film unit into the wrong opening for the selected magnification mode.

6. The copy camera of claim 5 further including means responsive to the operation of said mode selector for providing the operator with a visual indication of which object plane to use in connection with an unblocked one of said first and second openings.

7. The copy camera of claim 6 wherein said camera is configured to make copies of slide transparencies and further includes first and second slide preview stations corresponding to said one and another of said magnification modes and said visual indication include means for illuminating the corresponding one of said first and second preview stations.

8. The copy camera of claim 1 wherein it is configured to make copies of slide transparencies on film units that have a different normalized image area format than said transparencies and said one magnification mode provides a full frame image of said transparency on the film unit and the other magnification mode provides an image of a selected portion of said transparency frame.

9. The copy camera of claim 1 wherein said object support means includes a slide holder for receiving and supporting a slide transparency and said holder is movable between positions locating a slide therein either at a projection position in alignment with said lens or at a preview position to one side thereof.

10. The copy camera of claim 9 further including a source of artificial illumination aligned with said lens for illuminating a slide at said projection position and said holder is mounted for movement in directions transverse to a common optical axis of said illumination source and said lens.

* * * * *